Figure 3:
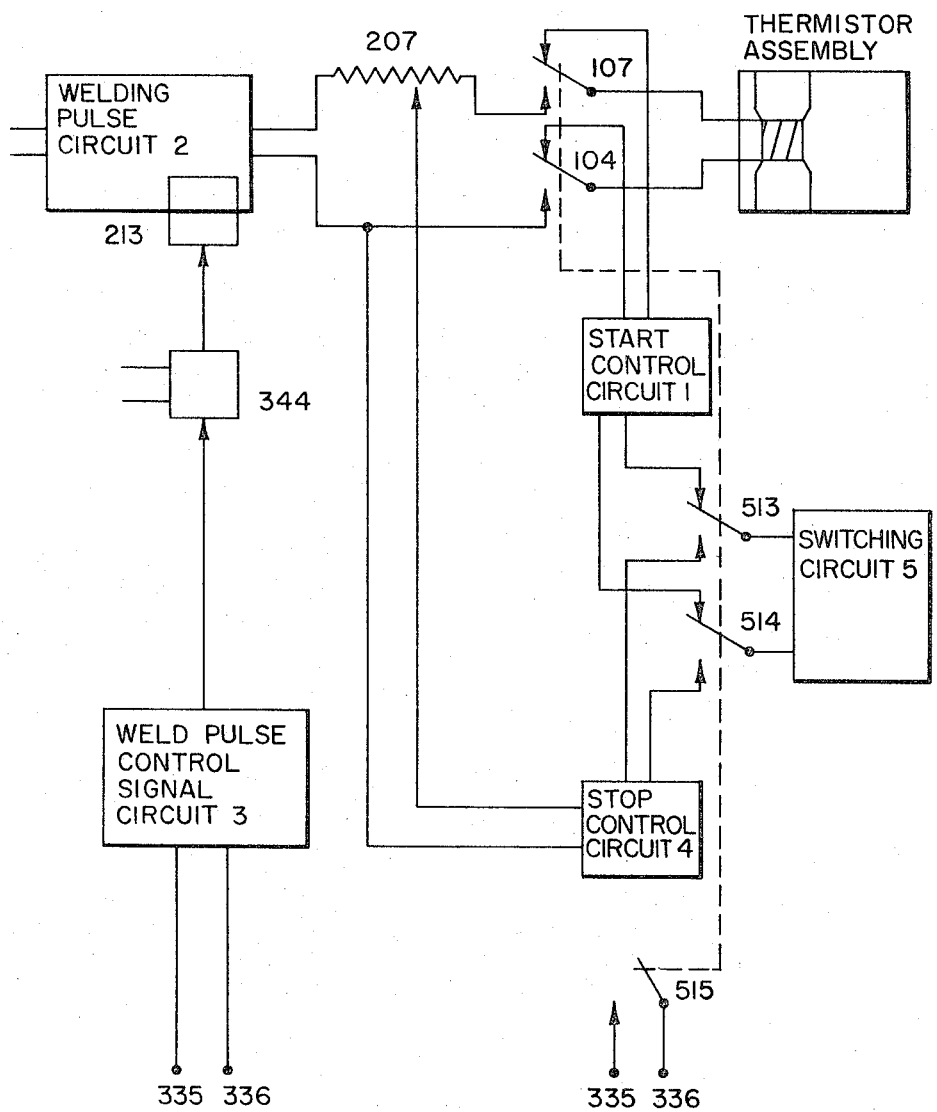

Feb. 6, 1968  E. F. ZIEMENDORF ET AL  3,368,058
ELECTRICAL WELDING METHOD AND APPARATUS
Filed Feb. 27, 1964  2 Sheets-Sheet 1
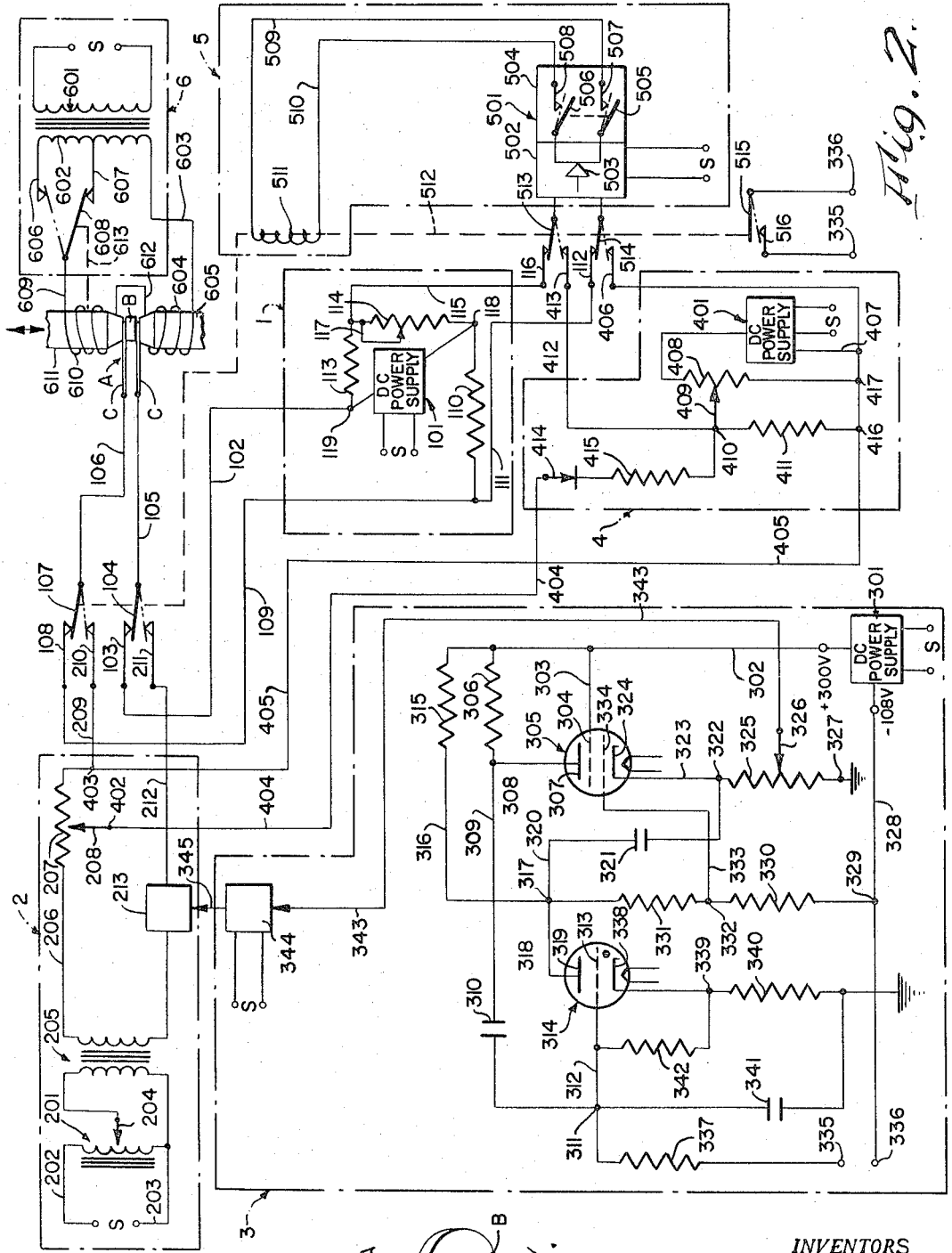
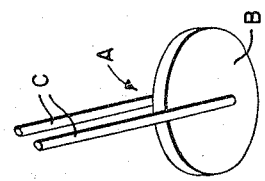
*INVENTORS*
EDWIN F. ZIEMENDORF
JOHN R. LAMPUS INVENTORS
EDWIN F. ZIEMENDORF
JOHN R. LAMPUS
BY
H.W. Brownell

3,368,058
ELECTRICAL WELDING METHOD AND APPARATUS
Edwin F. Ziemendorf, Wilson, and John R. Lampus, Tonawanda, N.Y., assignors to The Carborundum Company, Niagara Falls, N.Y., a corporation of Delaware
Filed Feb. 27, 1964, Ser. No. 347,862
20 Claims. (Cl. 219—110)

This invention relates to improvements in electrical welding systems, and more particularly to new and improved method and apparatus for welding electrical leads to a body having a resistance which changes with its temperature, such as a single crystal of silicon carbide having a negative temperature coefficient of resistivity, in order to form an assembly, such as a thermistor assembly.

A thermistor, as the term is employed herein, is an electrical resistance body having a high sensitivity to changes in temperature over a wide temperature range. Thus, its electrical resistance is sensitive to change with changes in its temperature. Thermistors which decrease in resistivity with increase in temperature are said to have a negative temperature coefficient of reistivity.

Polycrystalline thermistors have been available commercially for many years and have proved extremely useful in a wide variety of applications. However, the great potential for thermistors as accurate sensing units has not been fully exploited, because polycrystalline thermistors cannot be reproduced within close tolerance of electrical parameters, such as resistivity at a given temperature, viz room temperature, or over a range of temperatures. It has been possible to obtain thermistors within close tolerance limits only by careful selection from large numbers produced on the assembly lines. This leads to very high unit costs and an unpredictable device when the use of large quantities of reproducible thermistors is required.

Moreover, recent developments in space travel hardware such as aircraft, space craft, missiles and satellites, have placed a premium on size and weight of the various components, including the thermistors used as temperature sensing devices.

In order to overcome these problems of high unit cost, size and weight, a single crystal silicon carbide thermistor device has been developed such as set forth in the copending application of Wingate A. Lambertson and Paul E. Carroll, Ser. No. 58,238, filed Sept. 26, 1960. However, in order to obtain optimum reproducibility of such single crystal thermistors in production, it is necessary to exert close control over device geometry, assembly and testing.

While suitable control over device geometry and testing have been obtained, an adequate solution to the problem of device assembly remained until development of the present invention. The principal difficulty has centered on the welding of the electrical lead wires to the crystal.

This has also been a difficult problem in the manufacture of semi-conductors in general. While direct currents, alternating currents, or pulsed currents have been employed to effect the bond, it has been found that reproducible electrical characteristics of the welded assemblies could not be obtained, notwithstanding the fact that the values of current, voltage and welding time were the same for each operation. Attempts to control the welding operation by measuring the temperature of the assemblies or leads have not been consistently successful because this value changes so rapidly during the welding that it is quite difficult to measure accurately and quickly enough to exert the proper control over the welding cycle for reproducible results. Likewise, mere visual observation of the presence of an alleged molten phase at the interface between the lead wires and a SiC crystal as the point at which the welding or fusing operation is to be discontinued, is not sufficiently accurate to obtain reproducible thermistors.

Another attempt to produce semi-conductor devices with a high degree of reproducibility in electrical characteristics has involved the provision of a predetermined area of contact between a pointed electrode and the semi-conductor body by preselection of the electrode material, the contact pressure, and the amplitude and duration of the forming current pulses in order to melt the semi-conductor body in a first region in the neighborhood of the electrode point and to thermally produce lattice disturbances in a second adjacent region independent of the first region. However, this procedure is limited to the formation of rectifying contacts on semi-conductors formed by low melting materials such as germanium and silicon, and is not applicable to the formation of ohmic contacts on silicon carbide crystals which do not melt during such fusion operation.

Accordingly, it is a primary object of this invention to produce a new and improved welding method and apparatus which overcome this problem of obtaining a high degree of reproducibility in electrical characteristics by accurately controlling both the starting and stopping of the operation of welding the electrical leads to the resistance body in forming the assembly.

This is accomplished by monitoring the changing resistance of the assembly as it is heated until this resistance reaches a predetermined value permitting welding, at which time the welding operation is begun, and by monitoring the controlled changing welded current pulse passing through the assembly until the pulse reaches a predetermined value, at which point the welding operation is discontinued, to fix the resistance of the assembly at a standard reference temperature such as room temperature, viz. 25° C.

While the inventive method and apparatus can be adapted readily for welding leads to any electrical resistance body they are particularly adapted for welding leads to single crystal silicon carbide thermistors, in order to produce ohmic contacts of relatively broad area. The inventive method and apparatus have been employed to produce such thermistor devices having a resistance reproducible within plus or minus 2% at 25° C.

Another object is to provide a new and improved welding method and apparatus wherein the changing resistance of the heated assembly is monitored by comparing the voltage drop across the assembly with the voltage drop across a preset start control resistance arranged on the opposite side of a bridge circuit as the assembly; wherein the welding current pulse is passed through the assembly when a predetermined relationship between these voltage drops is established to indicate that the resistance of the assembly has reached a predetermined value; wherein the pulse is monitored by comparing the voltage drop across a preset viewing resistance arranged in series with the assembly with the voltage drop across a preset stop control resistance arranged in parallel with the viewing resistance in a voltage differential circuit connected across the viewing resistance, and wherein the pulse is removed from the assembly when a predetermined relationship is established between the voltage drops across the viewing and stop control resistances to indicate that the pulse has reached a predetermined value.

A further object is to provide a new and improved welding apparatus wherein various circuit means are provided for automatically performing the aforesaid operations.

Still another object is to provide a new and improved welding apparatus wherein circuit means including a saw tooth wave generator are provided for influencing the character of the weld by producing a signal to efficiently and effectively control the welding pulse, and conditionally, the duration of the welding operation. More specifically, such saw tooth wave generator is so constructed and designed as to eliminate unnecessary auxiliary circuitry normally found in commercial devices, to autoterminate the signal and hence the pulse at the end of a single cycle or signal, regardless of other conditions, e.g. if the voltage for removing the welding pulse from the assembly be preset too high, and to require reenergization of its circuit means each time a signal and pulse are to be produced, in order to present the same conditions for each successive welding operation.

Other objects and advantages of the invention will become apparent upon consideration of the following detailed description and accompanying drawings wherein:

FIG. 1 is an enlarged perspective view of a thermistor assembly welded in accordance with the present invention, FIG. 2 is a schematic circuit diagram of a preferred embodiment of the inventive apparatus employed to practice the invention, and FIG. 3 is a block diagram of the embodiment of this invention shown in FIG. 2. Reference characters refer to the same elements as in FIG. 2.

THERMISTOR ASSEMBLY

Referring to the drawing, and particularly FIG. 1, the thermistor assembly is generally indicated at A. This device is composed of a single crystal of boron doped silicon carbide in the preferred form of a circular disc B having a diameter of .05 inch and a thickness of .01 inch. Welded or fused (these terms are used interchangeably herein) longitudinally across the centers of the opposite major faces of disc B are a pair of preferably tungsten lead wires C, each having a diameter of .005 inch and a length of .5 inch. After being welded, assembly A is encapsulated with a suitable resin or ceramic bead (not shown) for oxidation resistance and increased strength.

When welded in accordance with the present invention, thermistor assembly A combines high stability, small size, fast response, useful resistance and temperature coefficient across a very broad range of ambient temperatures, and a signal response more linear across a given temperature range than conventional multicrystalline thermistors and stronger than that of resistance thermometers and thermocouples.

APPARATUS

Referring to FIG. 2 and FIG. 3, a preferred embodiment of the inventive welding apparatus will now be described in detail. This apparatus includes the usual 110 volt, 60 cycle A.C. power source S shown at seven different points purely for convenience and simplicity of illustration. Connected at source S are five different circuits, generally indicated at 1, 2, 3, 4 and 5 within the areas bounded by the dot-dash lines. This dot-dash line enclosure system for the various circuits is not intended to be either restrictive or all inclusive, but is merely a device employed for convenience and clarity of description. In addition, a sixth circuit is generally indicated at 6 in a similar manner. However, this sixth circuit forms no part of the inventive apparatus and is merely included for a more complete understanding of the invention.

Continuing with circuit 6, it includes a magnetic core transformer composed of a primary 601 connected to source S and a secondary 602 connected at one end by a lead 603 to heater coil 604 surrounding a fixed lower welding anvil 605. Secondary 602 is also provided with two taps or contacts 606 and 607 for alternate connection with a movable switch arm 608 connected through a lead 609 to a heater coil 610 surrounding a movable upper welding anvil 611 and in turn connected through lead 612 to the lower coil 604. Contact 607 is also mechanically connected to upper anvil 611 by any suitable means represented by the dotted line 613 for moving switch 608 into the upper or dotted line position. As will be explained in greater detail below, the upper anvil 611 is moved from an upper inoperative position (not shown) to its illustrated lower operative position by any suitable means (not shown) in order to clamp disc B and lead wires C of thermistor assembly A together for welding, as well as to move switch 608 to its upper dotted line position for increasing the voltage to heaters 605 and 610, and thereby increase the heat applied to assembly A, all prior to the welding operation.

Referring once again to the five circuits constituting a preferred embodiment of the inventive apparatus, the start monitoring or control circuit 1 includes a resistance bridge circuit provided with its own conventional voltage stabilized D.C. power supply 101 connected to source S. One side of the bridge includes line 102, contact 103, movable switch arm 104, line 105, leads C and crystal B of assembly A, line 106, movable switch arm 107, contact 108, line 109 and resistor 110, this side being connectable to the fifth circuit 5 by line 111 and contact 112. The other side of the bridge includes resistor 113 and a preset variable start control resistance 114, this side being connected to the fifth circuit 5 by line 115 and contact 116. Resistance 114 is provided with a slide 117 and power supply is connected across the opposite sides at points or junctions 118, 119. The value of start control resistance 114 is preset so that the bridge circuit will pass through balance when the voltage drop across assembly A is equal to the voltage drop across resistance 114, thereby reversing the polarity of contacts 112 and 116.

The welding pulse passing circuit 2 includes a variable voltage magnetic core type transformer 201 connected across A.C. mains 202, 203 for controlling the line voltage, and for the particular assembly illustrated, for reducing the 110 volts from source S to 50 volts input through tap 204 to the primary of a magnetic core power transformer 205. From one side of the secondary of transformer 205 the current flows through line 206 and a preset viewing resistance 207 arranged in series with assembly A and provided with a slide 208. Continuing, the current flows through line 209, contact 210, movable switch 107 (when in the lower, dotted line position), line 106, leads C and crystal B of assembly A, returning via line 105, movable switch 104 (when in the lower, dotted line position), contact 211, line 212 and gate 213 to the other side of the secondary of transformer 205. The gate 213 is of the conventional type, basically being composed of a silicon controlled rectifier and a bridge network of diodes which control the direction of the current flow.

The signal producing circuit 3 for controlling the welding pulse includes its own D.C. power supply 301 connected across A.C. source S for producing +300 and −108 D.C. volts to the following saw tooth generator circuitry. Connected to the positive side 302 of supply 301 through lead 303 is a secondary grid 304 (only one of two being shown) of a conventional pentode 305. Likewise a resistor 306 is connected to positive side 302 and this in turn is connected to the plate 307 of pentode 305 by lead 308. A line 309 containing a feedback capacitance 310 is connected at one end to resistor 306 and at its other end through junction 311 and lead 312 to the grid 313 of a gas triode 314. Returning to positive side 302, another resistor 315 is connected thereto and through line 316 to junction 317. A lead 318 connects junction 317 to the plate 319 of triode 313. Leading from the junction 317 is another line 320 containing capacitance 312 and terminating at junction 322, one side of which is connected by lead 323 to the cathode 324 of pentode 305, and the other side of which is connected to a grounded variable resistor 325 provided with a slide 326 and junction or point 327.

Connected to the negative side 328 of D.C. supply 301 at junction 329 is a voltage divider composed of resistors 330 and 331 separated by a junction 332 connected by lead 333 to the control grid 334 of pentode 305, with resistance 331 being connected to junction 317. Also connected to negative side 328 through contacts 335, 336

(shown both at the lower left and right-hand corners of FIG. 2 for convenience) is one end of a resistor 337, the other end of which is connected to junction 311. The cathode 338 of triode 314 is connected by junction 339 to one end of resistor 340, the other end of which is grounded. A capacitance 341 is connected between junction 311 and the grounded end of resistor 340, and a resistor 342 is connected between lead 312 and junction 339. The output of pentode 305 is taken between points 326 and 327 through line 343 to gate control 344 in turn connected by line 345 to gate 213 in circuit 2.

The gate control 344 is, of course, connected to source S, as shown, and is of conventional construction, being basically composed of a saturable core transformer and a phase shifting network for modifying the saw tooth output signal of pentode 305 to a square shape wave which is impressed upon gate 213 and controls the same to the extent required for passing a welding current pulse of desired amplitude and frequency.

Likewise, the saw tooth generator portion of circuit 3 is conventional except that it is designed for only a single sweep operation and this excludes extraneous auxiliary circuitry normally found in commercial devices. Moreover, as noted above, this generator circuit includes a feedback capacitance 310 connected between the plate 307 of pentode 305 and the grid 313 of triode 314. It has been discovered that by keeping the triode plate current low, i.e. less than 10 milliamps, through proper selection of the values of the triode plate and cathode resistors, the triode grid can be used to ionize or deionize the triode. Further, it has been discovered that by the use of the feedback capacitance 310 between the pentode plate and triode grid, the production of more than one output signal from pentode 305 is prevented until the third circuit is reenergized by reclosing contacts 335, 336. Thus, the signal to the gate control 344 and from this control to gate 213 will be the same each time for passing the same welding current pulse each time circuit 3 is energized and circuit 2 is simultaneously connected to assembly A. This will be explained in greater detail below in describing the operation of the entire apparatus.

Continuing with FIG. 2, the stop monitoring or control circuit 3 includes its own conventional D.C. power supply 401 connected to source S. However, D.C. supply 401 is current stabilized, as opposed to the voltage stabilized power supply 101 in circuit 1. Circuit 4 is connected across viewing resistor 207 at points or junctions 402 and 403 by line 404 and 405 respectively and includes a voltage differential circuit, one side of which includes the line 405 starting at junction 403, terminating at contact 406 and connected by lead 407 to one side of D.C. supply 401. At preset variable stop control resistance 408 is connected between line 405 and the otheer side of D.C. supply 401 and is provided with a slide 409 leading from junction 410. A resistance 411 is connected between line 405 and junction 410 from which a line 412 leads to contact 413. Line 404 includes a diode rectifier 414 and another resistance 415 connected in series between junction 410 and junction 402. Thus, stop control resistance 408 can be said to be arranged in parallel with viewing resistance 207.

The A.C. voltage developed across viewing resistor 207 is first rectified by diode 414 to produce a D.C. voltage drop across resistor 411, which voltage drop is, of course, directly proportional to the voltage drop across viewing resistor 207. When the voltage drop across resistor 411 (which is the rectified voltage drop across viewing resistor 207), measured between points 410 and 416, equals or exceeds the voltage drop across preset stop control resistance 408, measured between points 410 and 417, the polarity of contacts 406 and 413 is reversed, to remove the pulse from the assembly A, as will be explained in greater detail below in the description of the circuit 5 and the operation of the entire apparatus.

Referring to the switching circuit 5, it includes a relay amplifier generally indicated at 501. The amplifier section 502 is connected to A.C. source S and includes a polarity sensitive amplifier 503. The relay section 504 includes an internal relay (not shown) for actuating normally open dual pole, single throw switch arms 505, 506 and which switches are closed against contacts 507 and 508 respectively, by the internal relay in response to a signal from amplifier section 502. This, in turn, closes the circuit through lines 509 and 510 to external relay solenoid 511 which is mechanically connected by any suitable means (represented by the broken line 512) with switches 104, 107, 513, 514 and 515.

When deenergized by circuit 4, as the voltage differential circuit therein passes through balance, solenoid 511 simultaneously moves switches 104, 107, 513, 514 and 515 from the dotted line positions to the solid line resistance monitoring positions. Thus, switches 104, 107 connect circuit 1 instead of circuit 2 with assembly A for monitoring the changing resistance of the assembly as it is heated; switches 513, 514 connect circuit 5 with circuit 1 instead of circuit 4, and switch 515 opens contacts 335, 336 in circuit 3. When energized by circuit 1 as the bridge circuit passing through balance, solenoid 511 moves switches 104, 107, 513, 514 and 515 from the solid line positions to the dotted line, welding and pulse monitoring positions. Thus switches 104, 107 connect circuit 2 instead of circuit 1 with assembly A for passing the controlled changing welding current pulse through the assembly, switches 513, 514 connect circuit 5 with circuit 4 instead of circuit 1, and switch 515 colses contacts 335 and 336, energizing circuit 3.

OPERATION

Prior to the welding operation, the leads C and the crystal B forming assembly A are assembled in the position shown between the upper and lower anvils 611 and 605, respectively. At this time, both the upper and lower anvils are being heated by the heater coils 610 and 604 respectively, but the voltage on the heaters is low, i.e. about 10 volts, and the upper anvil 611 is in its upper or inoperative position (not shown). Once assembly A is in place, upper anvil 611 is then moved into its illustrated lower operative position by any suitable means, such as a push-button operated hydraulic motor (not shown) to clamp assembly A in place. The tips of the anvils 605 and 611 may be provided with grooves (not shown) for accommodating the leads C. As the upper anvil 611 moves downwardly, a mechanical connection through dotted line 613 moves switch 608 from its lower solid line position to its upper dotted line position, whereupon the voltage to the heater coils 604 and 610 is increased in order to increase the heat being applied to assembly A.

As it is heated, the temperature of assembly A increases, and its resistance decreases, since the assembly has a negative temperature coefficient of resistivity. This changing resistance is monitored through leads 105, 106; switches 104, 107; contacts 103, 108 (the switches being in the upper solid line position), and leads 102, 109 to start control circuit 1. Thus, a voltage drop is produced across assembly A and this voltage drop will reach a predetermined value equalling the value of the voltage drop across preset start control resistor 114, the values of resistors 110 and 113 being set accordingly. When the voltage drop across assembly A is equal to the voltage drop across preset resistor 114, the bridge will pass through balance, thereby reversing the polarity of contacts 112 and 116. This reversal of polarity causes the polarity sensitive amplifier 503 to energize the internal relay (not shown) in relay section 504 and close switches 505 and 506 against contacts 507 and 508 respectively, thereby energizing relay solenoid coil 511 to simultaneously move switches 104, 107, 513, 514 and 515 from the solid line to dotted line positions.

Thus, circuit 1 causes circuit 5 to be connected with circuit 4 through switches 513, 514 and contacts 406 and 413 respectively, to energize circuit 3 by closing switch 515 against contact 516, thereby completing the circuit across contacts 335, 336, and to connect circuit 2 instead of circuit 1 with assembly A through switches 104 and 107 and contacts 211 and 210 respectively. Accordingly, energization of circuit 3 produces a signal from a pentode 305, which signal is modified by gate control 344 and impressed upon gate 213 in circuit 2 to pass a controlled changing welding current pulse through assembly A.

More specifically, in energized circuit 3, the saw tooth generator is triggered, because triode 314 is deionized through the application of a large negative bias voltage through resistor 337 to grid 313 of triode 314. This also raises the charge across feedback capacitor 310 which is normally at the plate supply potential of +300 volts by virtue of the circuit through resistors 306, 342 and 340. The plate 319 of triode 314 is below the supply voltage, because in the conducting state, the triode is drawing current through the resistor 315, thus producing a voltage drop across this resistor. When triode 314 is deionized by closing the circuit across contacts 335, 336, capacitor 321 begins to charge to a higher potential value, and at the same time, causes control grid 334 of pentode 305 to go positive and allow the pentode to conduct between plate 307 and cathode 304.

The output of pentode 305 taken at points 326 and 327 across the variable resistor 325 will reflect the charging of capacitor 321 and the conduction of the pentode as a rising voltage from 0 to the desired level, i.e. on the order of 10 volts. When capacitor 310 is charged to a value higher than the plate supply potential, capacitor 321 is charged to the plate supply potential. Thus, triode 314 will again conduct, suddenly discharging capacitor 321, restoring a negative bias to control grid 334 of pentode 305 through the voltage divider composed of resistors 330, 331, cutoff the current through pentode 305, and thereby terminate the saw tooth signal at the end of one signal. This single cycle is repeated each time circuit 3 is energized.

Therefore, it will now be apparent that the saw tooth generator portion of circuit 3 has been considerably simplified as compared to those of commercially available models by the elimination of unnecessary auxiliary circuitry and the single sweep operation produced by feedback capacitor 310 connected between plate 307 of pentode 305 and grid 313 of triode 315 ensures that the same signal will be impressed upon gate 213 each time circuit 3 is energized. As a result, gate 213 will pass the same welding pulse for each welding operation, to ensure reproducible thermistor assemblies.

Referring once again to circuit 3, the saw tooth signal applied to gate control 344 is modified therein to a square wave signal which is impressed upon gate 213 in circuit 2 so that the gate opens to pass a controlled changing welding current pulse of the desired frequency and amplitude, and which pulse is directly proportional to the saw tooth voltage at any given instant, to the setting of the variable voltage transformer 205 and to the resistance of thermistor assembly A. Welding transformer 205 provides isolation from A.C. mains 202, 203 and the correct welding voltage for a range of devices, the particular voltage desired for the particular thermistor assembly A shown being 50 volts. The welding current is in the range from 0 to 10 amps.

The welding operation is automatically terminated by a feed-back signal developed by viewing resistor 207. The A.C. signal developed across slider 208 between points 402 and 403 is proportional to the welding current through viewing resistor 207 and the amplitude is determined by the adjustment of slider 208. The A.C. signal voltage developed by viewing resistor 207 is then applied to the stop monitoring or control circuit 4. The A.C. voltage in line 404 is first rectified by diode 414 to produce a D.C. voltage drop across resistor 411, and when this voltage drop equals or exceeds the preset reference voltage drop from D.C. power supply 401 across stop control resistor 408, the polarity of contacts 406 and 413 is reversed. Thus, a stop signal is applied to the polarity sensitive amplifier section 502 which deenergizes the internal relay in section 504 to open switches 504 and 506, and thereby deenergize relay solenoid 511. As a result, the positions of switches 104, 107, 513, 514 and 515 are reversed from the dotted line positions to the solid line positions.

Thus, it is evident that circuit 4 causes circuit 5 to be connected with circuit 1 instead of circuit 4 through switches 513, 514 and contacts 112, 116, respectively. At the same time circuit 5 connects circuit 1 instead of circuit 2 with assembly A through switches 104, 107 and contacts 103, 108 respectively, in order to remove the welding pulse from the assembly. At the same time, switch 515 is opened to open circuit 3.

For a particular thermistor assembly A, it readily can be determined experimentally what the predetermined value of the welding pulse should be in order to provide the proper weld, and the values of the viewing resistor 207 and stop control resistor 408 can be preset accordingly. In the event that a mistake is made in the setting of one or both of these resistors, resulting in continuation of the welding cycle beyond the desired cutoff point, circuit 3 will auto-terminate the welding operation at the end of one signal produced by pentode 305, because the charging of feedback capacitance 310 will automatically reionize triode 314 and cut off pentode 305 at the end of one signal. Thus, gate 213 will close at this time and prevent passage of the welding current, to avoid irreparable damage to assembly A.

At the completion of each welding operation, the upper welding anvil 611 is once again raised to automatically return switch 608 to the low voltage, solid line position; the welded assembly A is removed, and another assembly is inserted for a subsequent welding operation.

METHOD

In practicing the method of the invention it is not necessary to employ the exact apparatus described above. From a procedural standpoint, the essential steps are: monitoring of the changing resistance of the assembly as it is heated, passing a controlled changing welding current pulse through the assembly when its resistance reaches a predetermined value, monitoring this pulse as it passes through the assembly, and removing the pulse from the assembly when the pulse reaches a predetermined value.

For example, it readily can be determined experimentally what the desired resistance of or voltage drop across assembly A should be in order to start the welding operation, and this resistance or voltage drop could be measured directly by an ohmmeter or voltmeter connected across leads C, and a manual switch could be employed to simultaneously energize circuit 3 and connect circuit 2 with the assembly. However, for accuracy it is preferred that the voltage drop across assembly A be compared with the voltage drop across preset start control resistance 114 arranged on the opposite side of the bridge circuit as the assembly. Even in this instance, a voltmeter could be connected across preset start control resistor 114 between the slide 117 and junction 118 to directly measure such voltage drop. Thus, when these voltage drops become equal or have any other desired predetermined relationship, circuit 3 could be energized and circuit 2 simultaneously connected with assembly A by means of a manually operated switch (not shown).

Moreover, the particular saw tooth voltage generator portion of circuit 3 could be replaced by a motor driven device designed to produce the desired signal to gate control 344, it being necessary to reenergize the motor each time a signal is to be produced.

While it is preferred that the pulse monitoring step be performed by comparing the rectified voltage drop across viewing resistance 207 with the voltage drop across preset stop control resistance 408 in the illustrated circuitry, it is also possible to experimentally determine what the desired voltage drop should be across viewing resistance 207 and to connect a voltage meter across this resistance at points 402, 403. Thus, when this voltage drop reaches the desired predetermined value, switches 104 and 107 could be manually moved from their dotted line positions to their solid line positions, thereby removing the pulse from the assembly at the appropriate point.

Even where the preferred voltage drop comparison is made, as noted above, circuit 5 could be eliminated and replaced by a manually operated relay to simultaneously move switches 104, 107, 513, 514 and 515 from their dotted line to solid line positions.

It will now be seen how the invention accomplishes its various objectives, and the numerous advantages thereof will likewise be apparent. While the invention has been preferred and illustrated herein with respect to certain preferred embodiments, it is to be understood that various changes and modifications may be made by those skilled in the art without departing from the invention, the scope of which is to be determined by the appended claims.

What is claimed is:

1. A method of welding electrical lead wires to a body having a resistance which changes with its temperature, such as a single crystal of silicon carbide having a negative temperature coefficient of resistivity, in order to form an assembly, such as a thermistor assembly, said method including the steps of monitoring the changing resistance of said assembly as it is heated, passing a welding current pulse of controlled increasing amplitude through said assembly when said resistance reaches a predetermined value, monitoring said pulse as it passes through said assembly, and removing said pulse from said assembly when said pulse reaches a predetermined value.

2. The method of claim 1 wherein said resistance monitoring step is performed by comparing the voltage drop across said assembly with the voltage drop across a preset start control resistance arranged on the opposite side of a resistance bridge circuit as said assembly, and wherein said pulse passing step is performed when said resistance reaches a predetermined value as indicated by a predetermined relationship between said voltage drops.

3. The method of claim 1 wherein said pulse monitoring step is performed by comparing the voltage drop across a preset viewing resistance arranged in series with said assembly with the voltage drop across a preset stop control resistance arranged in parallel with said viewing resistance in a voltage differential circuit connected across said viewing resistance, and wherein said pulse removing step is performed when said pulse reaches a predetermined value as indicated by a predetermined relationship between said voltage drops.

4. The method of claim 3 wherein said resistance monitoring step is performed by comparing the voltage drop across said assembly with the voltage drop across a preset start control resistance arranged on the opposite side of a resistance bridge circuit as said assembly, and wherein said pulse passing step is performed when said resistance reaches a predetermined value as indicated by a predetermined relationship between said voltage drops across said assembly and start control resistance.

5. Apparatus for welding electrical leads to a body having a resistance which changes with its temperature, such as a single crystal of silicon carbide having a negative temperature coefficient of resistivity, in order to form an assembly, such as a thermistor assembly, said apparatus comprising power supply means and a first circuit means for monitoring the changing resistance of said assembly as it is heated, a second circuit means for passing a welding current pulse of controlled increasing amplitude through said assembly, a third circuit means for producing a signal controlling said welding pulse, a fourth circuit means for monitoring and removing said welding pulse at a predetermined value and a fifth switching circuit means, said first circuit means being switchably connected to said assembly and to said fifth circuit means for energizing said fifth circuit means at a predetermined assembly resistance, said first circuit means being switchably disconnected and said second circuit means being switchably connected to said assembly when said fifth circuit means is energized, said third circuit means being connected to said second circuit means and being switchably connected to said fifth circuit means when said fifth circuit means is energized, and said fourth circuit means being connected with said second circuit means and switchably connected to said fifth circuit means when said fifth circuit means is energized.

6. The apparatus of claim 5 wherein said first circuit means includes a resistance bridge circuit having said assembly arranged on one side and a preset start control resistance arranged on its other side for monitoring said changing resistance of said assembly by comparing the voltage drop across said assembly with the voltage drop across said start control resistance, said bridge circuit causing said fifth circuit means to be connected with said fourth circuit means instead of said first circuit means to produce said signal and pass said pulse when said changing resistance of said assembly reaches a predetermined value as indicated by a predetermined relationship between said voltage drops.

7. The apparatus of claim 5 wherein said third circuit means includes a saw tooth wave generator having a gas triode, a pentode, and a feedback capacitance connected between the plate of said pentode and the grid of said triode, whereby upon energization of said third circuit means, said triode is deionized and said pentode conducts to produce said signal, but said capacitance charges to ionize said triode and cut off said pentode at the end of said signal, in order to prevent another signal from being produced until said third circuit means is reenergized.

8. The apparatus of claim 5 wherein said second circuit means includes a preset viewing resistance arranged in series with said assembly, said fourth circuit means is connected across said viewing resistance and includes a voltage differential circuit having a preset stop control resistance arranged in parallel with said viewing resistance for monitoring said pulse as it passes through said assembly by comparing the voltage drop across said viewing resistance with the voltage drop across said stop control resistance, said differential circuit causing said fifth circuit means to be connected with said first circuit means instead of said fourth circuit means to remove said pulse from said assembly when said pulse reaches a predetermined value as indicated by a predetermined relationship between said voltage drops.

9. The apparatus of claim 5 wherein said fifth circuit means includes relay means movable between one position wherein it is connected with said first circuit means instead of said fourth circuit means and connects said first circuit means instead of said second circuit means with said assembly and another position wherein it is connected with said fourth circuit means instead of said first circuit means, energizes said third circuit means and connects said second circuit means instead of said first circuit means with said assembly, said first circuit means causing said relay means to move to said other position to produce said signal and pass said pulse when said changing resistance of said assembly reaches a predetermined value, and said fourth circuit means causing said relay means to move to said one position to remove said pulse from said assembly when said pulse reaches a predetermined value.

10. The apparatus of claim 5 wherein said first circuit means includes a resistance bridge circuit having said assembly arranged on one side and a preset start control resistance arranged on the other side for monitoring said changing resistance of said assembly by comparing the voltage drop across said assembly with the voltage drop across said start control resistance, said bridge circuit causing said fifth circuit means to be connected with said fourth circuit means instead of said first circuit means to produce said signal and pass said pulse when said changing resistance of said assembly reaches a predetermined value as indicated by a predetermined relationship between said voltage drops, and wherein said third circuit means includes a saw tooth wave generator having a gas triode, a pentode, and a feedback capacitance connected between the plate of said pentode and the grid of said triode, whereby upon energization of said third circuit means, said triode is deionized and said pentode conducts to produce said signal, but said capacitance charges to ionize said triode and cut off said pentode at the end of said signal, in order to prevent another signal from being produced until said third circuit means is reenergized.

11. The apparatus of claim 5 wherein said first circuit means includes a resistance bridge circuit having said assembly arranged on one side and a preset start control resistance arranged on its other side for monitoring said changing resistance of said assembly by comparing the voltage drop across said assembly with the voltage drop across said start control resistance, said bridge circuit causing said fifth circuit means to be connected with said fourth circuit means instead of said first circuit means to produce said signal and pass said pulse when said changing resistance of said assembly reaches a predetermined value as indicated by a predetermined relationship between said voltage drops across said assembly and start control resistance, and wherein said second circuit means includes a preset viewing resistance arranged in series with said assembly, said fourth circuit means in connected across said viewing resistance and includes a voltage differential circuit having a preset stop control resistance arranged in parallel with said viewing resistance for monitoring said pulse as it passes through said assembly by comparing the voltage drop across said viewing resistance with the voltage drop across said stop control resistance, said differential circuit causing said fifth circuit means to be connected with said first circuit means instead of said fourth circuit means to remove said pulse from said assembly when said pulse reaches a predetermined value as indicated by a predetermined relationship between said voltage drops across said viewing and stop control resistances.

12. The apparatus of claim 5 wherein said first circuit means includes a resistance bridge circuit having said assembly arranged on one side and a preset start control resistance arranged on its other side for monitoring said changing resistance of said assembly by comparing the voltage drop across said assembly with the voltage drop across said start control resistance, and wherein said fifth circuit means includes relay means movable between one position wherein it is connected with said first circuit means instead of said fourth circuit means and connects said first circuit means instead of said second circuit means with said assembly and another position wherein it is connected with said fourth circuit means instead of said first circuit means, energizes said third circuit means and connects said second circuit means instead of said first circuit means with said assembly, said bridge circuit causing said relay means to move to said other position to produce said signal and pass said pulse when said changing resistance of said assembly reaches a predetermined value as indicated by a predetermined relationship between said voltage drops, and said fourth circuit means causing said relay means to move to said one position to remove said pulse from said assembly when said pulse reaches a predetermined value.

13. The apparatus of claim 5 wherein said third circuit means includes a saw tooth wave generator having a gas triode, a pentode, and a feedback capacitance connected between the plate of said pentode and the grid of said triode, whereby upon energization of said third circuit means, said triode is deionized and said pentode conducts to produce said signal, but said capacitance charges to ionize said triode and cut off said pentode at the end of said signal in order to prevent another signal from being produced until said third circuit means is reenergized, and wherein said second circuit means includes a preset viewing resistance arranged in series with said assembly, said fourth circuit means is connected across said viewing resistance and includes a voltage differential circuit having a preset stop control resistance arranged in parallel with said viewing resistance for monitoring said pulse as it passes through said assembly by comparing the voltage drop across said viewing resistance with the voltage drop across said stop control resistance, said differential circuit causing said fifth circuit means to be connected with first circuit means instead of said fourth circuit means to remove said pulse from said assembly when said pulse reaches a predetermined value as indicated by a predetermined relationship between said voltage drops.

14. The apparatus of claim 5 wherein said third circuit means includes a saw tooth wave generator having a gas triode, a pentode, and a feedback capacitance connected between the plate of said pentode and the grid of said triode, whereby upon energization of said third circuit means, said triode is deionized and said pentode conducts to produce said signal, but said capacitance charges to ionize said triode and cut off said pentode at the end of said signal, in order to prevent another signal from being produced until said second circuit means is reenergized, and wherein said fifth circuit means includes relay means movable between one position wherein it is connected with said first circuit means instead of said fourth circuit means and connects said first circuit means instead of said second circuit means with said assembly and another position wherein it is connected with said fourth circuit means instead of said first circuit means, energizes said third circuit means and connects said circuit means instead of said first circuit means with said assembly, said first circuit means causing said relay means to move to said other position to produce said signal and pass said pulse when said changing resistance of said assembly reaches a predetermined value, and said fourth circuit means causing said relay means to move to said one position to remove said pulse from said assembly when said pulse reaches a predetermined value.

15. The apparatus of claim 5 wherein said second circuit means includes a preset viewing resistance arranged in series with said assembly, said fourth circuit means is connected across said viewing resistance and includes a voltage differential circuit having a preset stop control resistance arranged in parallel with said viewing resistance for monitoring said pulse as it passes through said assembly by comparing the voltage drop across said viewing resistance with the voltage drop across said stop control resistance, and wherein said fifth circuit means includes relay means movable between one position wherein it is connected with said first circuit means instead of said fourth circuit means and connects said first circuit means instead of said second circuit means with said assembly and another position wherein it is connected with said fourth circuit means instead of said first circuit means, energizes said third circuit means and connects said second circuit means instead of said first circuit means with said assembly, said first circuit means causing said relay means to move to said other position to produce said signal and pass said pulse when said changing resistance of said assembly reaches a predetermined value, and said differential circuit causing said relay means to move to said one position to remove said pulse from said assembly when said pulse reaches a predetermined value as indicated by a predetermined relationship between said voltage drops.

16. The apparatus of claim 5 wherein said first circuit means includes a resistance bridge circuit having said assembly arranged on one side and a preset start control resistance arranged on its other side for monitoring the changing resistance of said assembly by comparing the voltage drop across said assembly with the voltage drop across said start control resistance, said bridge circuit causing said fifth circuit means to be connected with said fourth circuit means instead of said first circuit means to produce said signal and pass said pulse when said changing resistance of said assembly reaches a predetermined value as indicated by a predetermined relationship between said voltage drops across said assembly and start control resistance, wherein said third circuit means includes a saw tooth wave generator having a gas triode, a pentode, and a feedback capacitance connected between the plate of said pentode and the grid of said triode, whereby upon energization of said third circuit means, said triode is deionized and said pentode conducts to produce said signal, but said capacitance charges to ionize said triode and cut off said pentode at the end of said signal, in order to prevent another signal from being produced until said third circuit means is reenergized, and wherein said second circuit means includes a preset viewing resistance arranged in series with said assembly, said fourth circuit means is connected across said viewing resistance and includes a voltage differential circuit having a preset stop control resistance arranged in parallel with said viewing resistance for monitoring said pulse as it passes through said assembly by comparing the voltage drop across said viewing resistance with the voltage drop across said stop control resistance, said differential circuit causing said fifth circuit means to be connected with first circuit means instead of said fourth circuit means to remove said pulse from said assembly when said pulse reaches a predetermined value as indicated by a predetermined relationship between said voltage drops across said viewing and stop control resistances.

17. The apparatus of claim 5 wherein said first circuit means includes a resistance bridge circuit having said assembly arranged on one side and a preset start control resistance arranged on its other side for monitoring said changing resistance of said assembly by comparing the voltage drop across said assembly with the voltage drop across said start control resistance, wherein said third circuit means includes a saw tooth wave generator having a gas triode, a pentode, and a feedback capacitance connected between the plate of said pentode and the grid of said triode, whereby upon energization of said third circuit means, said triode is deionized and said pentode conducts to produce said signal, but said capacitance charges to ionize said triode and cut off said pentode at the end of said signal, in order to prevent another signal from being produced until said third circuit means is reenergized, and wherein said fifth circuit means includes relay means movable between one position wherein it is connected with said first circuit means instead of said fourth circuit means and connects said first circuit means instead of said second circuit means with said assembly and another position wherein it is connected with said fourth circuit means instead of said first circuit means, energizes said third circuit means and connects said second circuit means instead of said first circuit means with said assembly, said bridge circuit causing said relay means to move to said other position to produce said signal and pass said pulse when said changing resistance of said assembly reaches a predetermined value as indicated by a predetermined relationship between said voltage drops, and said fourth circuit means causing said relay means to move to said one position to remove said pulse from said assembly when said pulse reaches a predetermined value.

18. The apparatus of claim 5 wherein said first circuit means includes a resistance bridge circuit having said assembly arranged on one side and a preset start control resistance arranged on its other side for monitoring said changing resistance of said assembly by comparing the voltage drop across said assembly with the voltage drop across said start control resistance, wherein said second circuit means includes a preset viewing resistance arranged in series with said assembly, said fourth circuit means is connected across said viewing resistance and includes a voltage differential circuit having a preset stop control resistance arranged in parallel with said viewing resistance for monitoring said pulse as it passes through said assembly by comparing the voltage drop across said viewing resistance with the voltage drop across said stop control resistance, and wherein said fifth circuit means includes relay means movable between one position wherein it is connected with said first circuit means instead of said fourth circuit means and connects said first circuit means instead of said second circuit means with said assembly and another position wherein it is connected with said fourth circuit means instead of said first circuit means, energizes said third circuit means and connects said second circuit means instead of said first circuit means with said assembly, said bridge circuit causing said relay means to move to said other position to produce said signal and pass said pulse when said changing resistance of said assembly reaches a predetermined value as indicated by a predetermined relationship between said voltage drops across said assembly and start control resistance, and said differential circuit causing said relay means to move to said one position to remove said pulse from said assembly when said pulse reaches a predetermined value as indicated by a predetermined relationship between said voltage drops across said viewing and stop control resistances.

19. The apparatus of claim 5 wherein said third circuit means includes a saw tooth wave generator having a gas triode, a pentode, and a feedback capacitance connected between the plate of said pentode and the grid of said triode, whereby upon energization of said third circuit means, said triode is deionized and said pentode conducts to produce said signal, but said capacitance charges to ionize said triode and cut off said pentode at the end of said signal, in order to prevent another signal from being produced until said third circuit means is reenergized, wherein said second circuit means includes a preset viewing resistance arranged in series with said assembly, said fourth circuit means is connected across said viewing resistance and includes a voltage differential circuit having a preset stop control resistance arranged in parallel with said viewing resistance for monitoring said pulse as it passes through said assembly by comparing the voltage drop across said viewing resistance with the voltage drop across said stop control resistance, and wherein said fifth circuit means includes relay means movable between one position wherein it is connected with said first circuit means instead of said fourth circuit means and connects said first circuit means instead of said second circuit means with said assembly and another position wherein it is connected with said fourth circuit means instead of said first circuit means energizes said third circuit means and connects said second circuit means instead of said first circuit means with said assembly, said first circuit means causing said relay means to move to said other position to produce said signal and pass said pulse when said changing resistance of said assembly reaches a predetermined value, and said differential circuit causing said relay means to move to said one position to remove said pulse from said assembly when said pulse reaches a predetermined value as indicated by a predetermined relationship between said voltage drops.

20. The apparatus of claim 5 wherein said first circuit means includes a resistance bridge circuit having said assembly arranged on one side and a preset start control resistance arranged on one side and a preset start control resistance arranged on its other side for monitoring said changing resistance of said assembly by comparing the voltage drop across said assembly with the voltage drop across said starting resistance, wherein said third circuit means includes a saw tooth wave generator having a gas triode, a pentode, and a feedback capacitance connected between the plate of said pentode and the grid of said triode, whereby upon energization of said third circuit means, said triode is deionized and said pentode conducts to produce said signal, but said capacitance charges to ionize said triode and cut off said pentode at the end of said signal, in order to prevent another signal from being produced until said third circuit means is reenergized, wherein said second circuit means includes a preset viewing resistance arranged in series with said assembly, said fourth circuit means is connected across said viewing resistance and includes a voltage differential circuit having a preset stop control resistance arranged in parallel with said viewing resistance for monitoring said pulse as it passes through said asembly by comparing the voltage drop across said viewing resistance with the voltage drop across said stop control reistance, and wherein said fifth circuit means includes relay means movable between one position wherein it is connected with said first circuit means instead of said fourth circuit means and connects sad first circuit means instead of said second circuit means with said assembly and another position wherein it is connected with said fourth circuit means instead of said first circuit means, energizes said third circuit means and conects said second circuit means instead of said first circuit means with said assembly, said bridge circuit causing said relay means to move to said other position to produce said signal and pass said pulse when said changing resistance of said assembly reaches a predetermined value as indicated by a predetermined relationship between said voltage drops across said assembly and start control resistance, and said differential circuit causing said relay means to move to said one position to remove said pulse from said assembly when said pulse reaches a predetermined value as indicated by a predetermined relationship between said voltage drops across said viewing and stop control resistances.

References Cited

UNITED STATES PATENTS

| | | | |
|---|---|---|---|
| 1,288,589 | 12/1918 | Hood | 219—110 |
| 1,933,936 | 11/1933 | Schnetzer | 219—110 |
| 2,384,923 | 9/1945 | James | 219—110 |
| 3,068,350 | 12/1962 | Archer | 219—110 |

RICHARD M. WOOD, *Primary Examiner.*

B. A. STEIN, *Assistant Examiner.*